US006029965A

United States Patent [19]

Lee

[11] Patent Number: 6,029,965

[45] Date of Patent: Feb. 29, 2000

[54] CLAMP SEAT OF WORKBENCH

[76] Inventor: Chi Pin Lee, No. 158, Renhuah Road, Dali, Taiwan

[21] Appl. No.: 09/121,618

[22] Filed: Jul. 22, 1998

[51] Int. Cl.[7] ........ B23Q 1/25

[52] U.S. Cl. ........ 269/68; 269/69; 269/901; 269/139

[58] Field of Search ........ 269/68, 67, 69, 269/139, 901, 136, 219, 220

[56] References Cited

U.S. PATENT DOCUMENTS

| | | | |
|---|---|---|---|
| 2,366,385 | 1/1945 | Comfort | 269/69 |
| 3,848,865 | 11/1974 | Bird | 269/69 |
| 4,154,435 | 5/1979 | Alessio | 269/901 |
| 5,065,989 | 11/1991 | Ho | 269/139 |

*Primary Examiner*—James G. Smith
*Assistant Examiner*—Lee Wilson
*Attorney, Agent, or Firm*—Pro-Techtor International Services

[57] ABSTRACT

A clamp seat of workbench is composed of a seat body, a bearing plate and an elastic clamp. The seat body is of a U-shaped construction and is provided with a plurality of locating holes. The bearing plate is provided with a control handle having a retaining block. The elastic clamp is located in an axial hole of the control handle and is provided with a locating block capable of engaging the locating holes of the seat body so as to set the locating angle of the bearing plate.

4 Claims, 6 Drawing Sheets

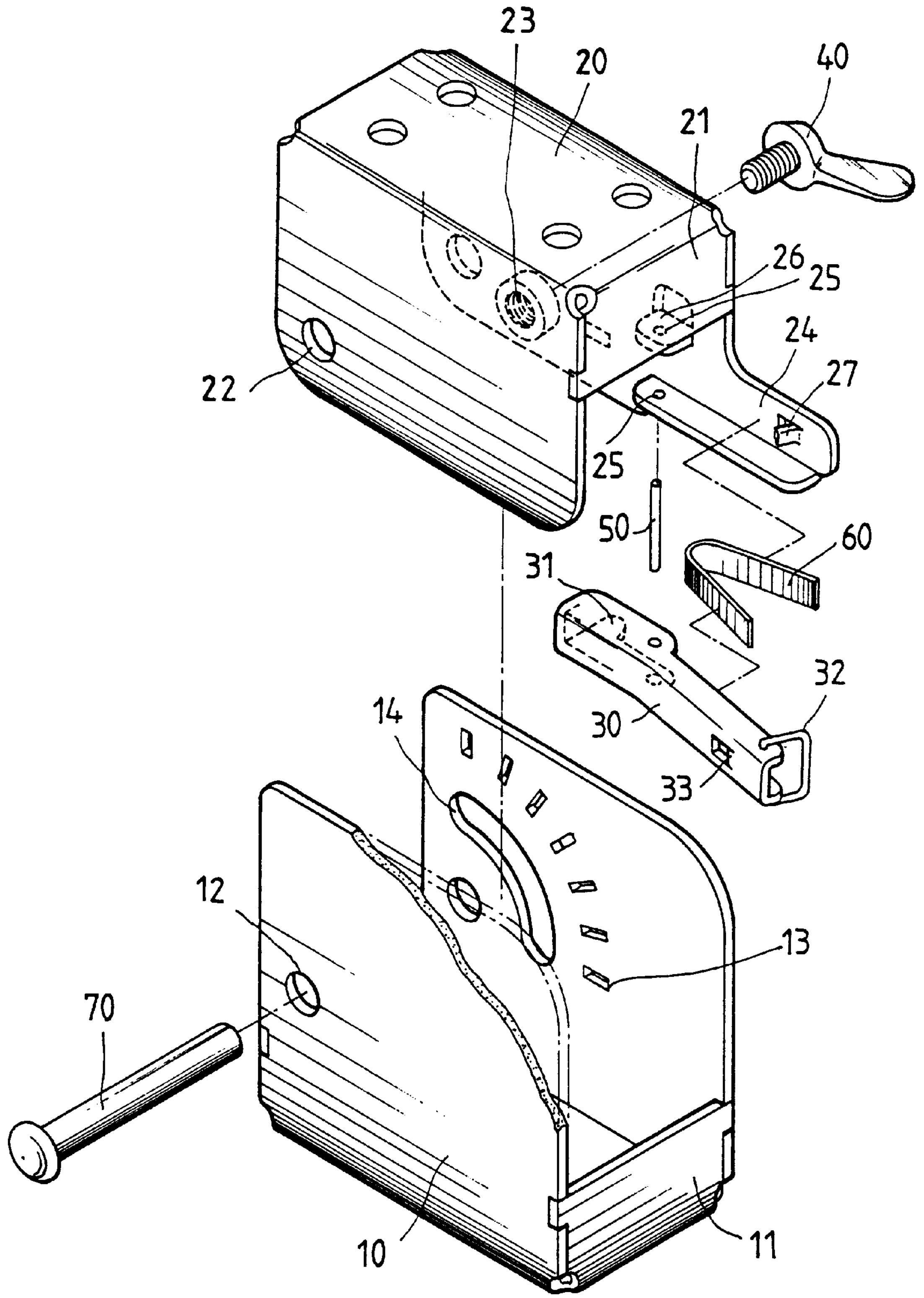
FIG, 1

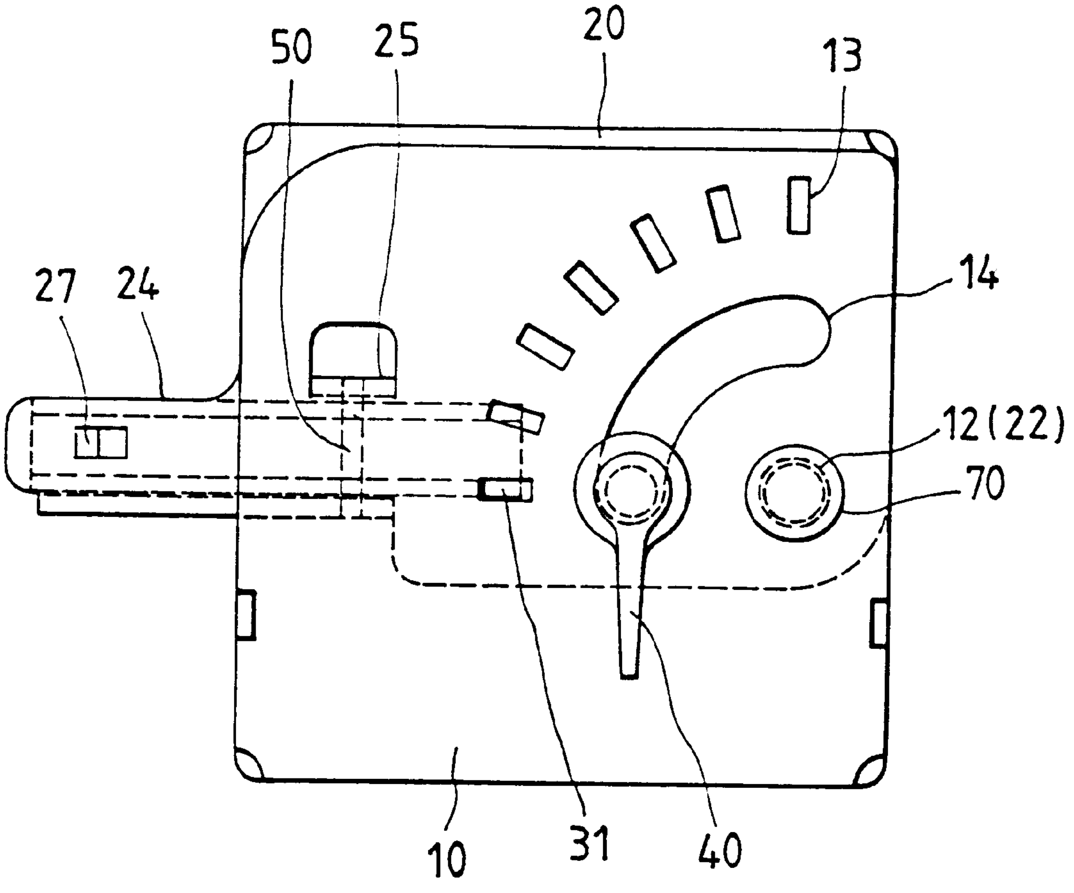
FIG, 2

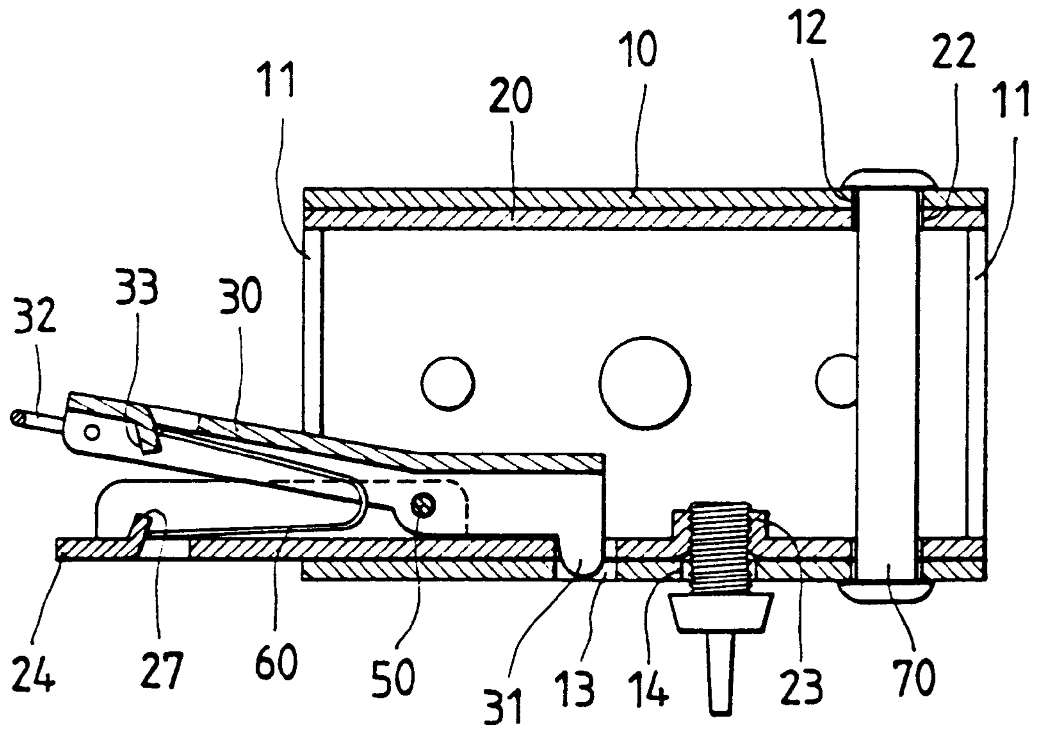
FIG, 3

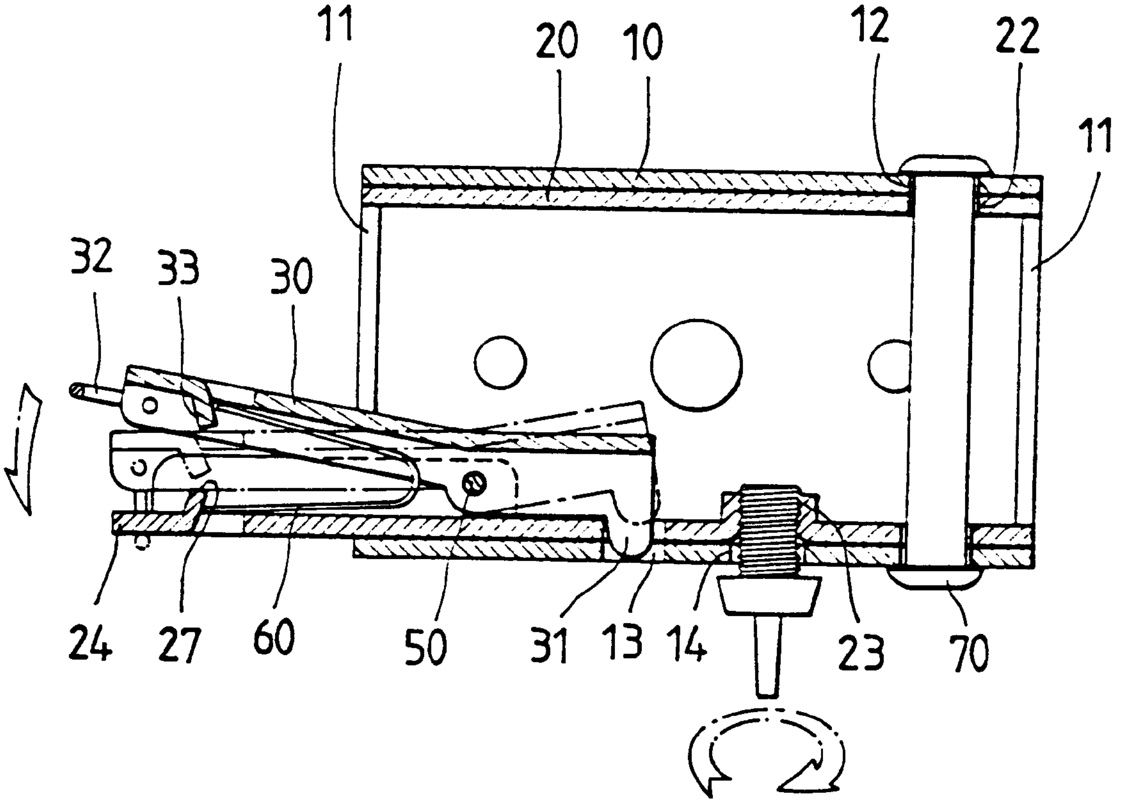
FIG, 4

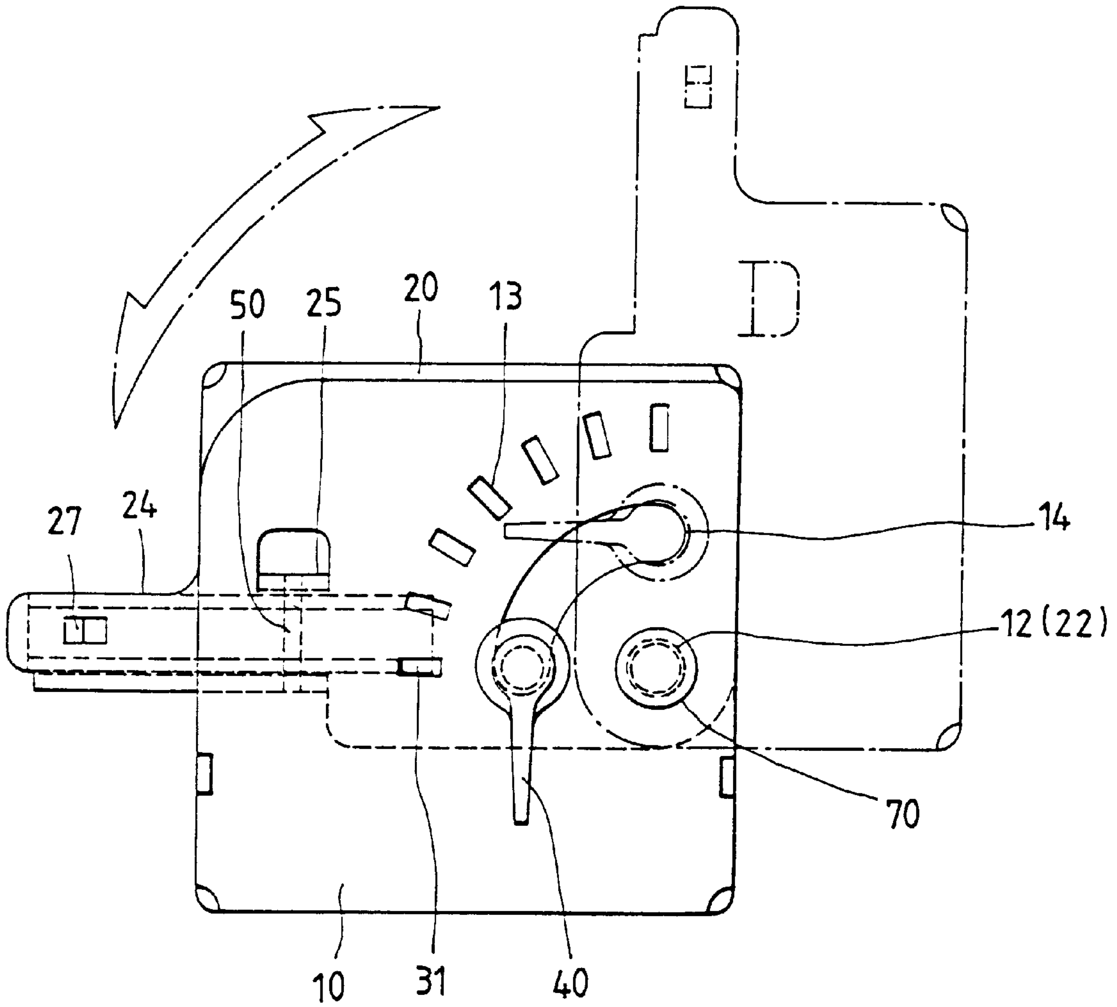
FIG, 5

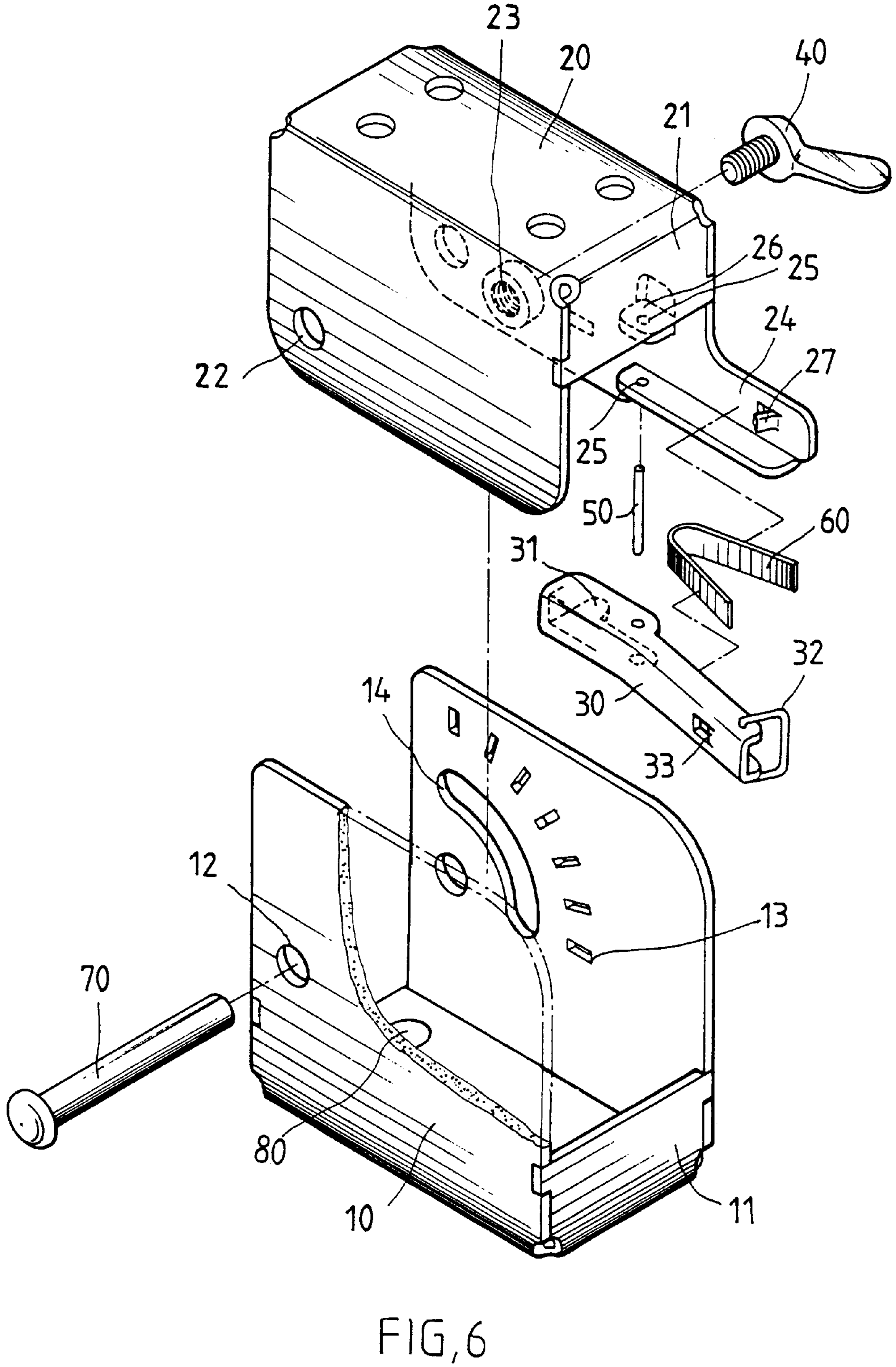
FIG,6

CLAMP SEAT OF WORKBENCH

FIELD OF THE INVENTION

The present invention relates generally to a workbench, and more particularly to a clamp seat of the workbench.

BACKGROUND OF THE INVENTION

The prior art clamp seat of the workbench is generally composed of two fastening plates, and a locating column fastened movably between the two fastening plates. The locating column is fitted into a spring which enables the locating column to be retained in locating holes of the lower fastening plate such that the upper fastening plate is positioned angularity.

Such a prior art clamp set is defective in design in that the locating angle can not be set by the locating column with ease and precision.

SUMMARY OF THE INVENTION

The primary objective of the present invention is to provide a workbench with an improved clamp seat which is free from the drawback of the prior art clamp seat described above.

In keeping with the principle of the present invention, the foregoing objective of the present invention is attained by a clamp seat, which consists of a seat body, a bearing plate, and an elastic clamp. The seat body is of a U-shaped construction and is provided with a plurality of locating holes. The bearing plate is provided with a control handle having a retaining block. The elastic clamp is located in an axial hole of the control handle and is provided with a locating block capable of engaging the locating holes of the seat body so as to set the locating angle of the bearing plate.

BRIEF DESCRIPTION OF THE DRAWINGS

FIG. 1 shows an exploded view of the preferred embodiment of the present invention.

FIG. 2 shows a schematic plan view of the preferred embodiment of the present invention.

FIG. 3 shows a sectional view of the preferred embodiment of the present invention.

FIG. 4 shows a schematic view of the present invention at work.

FIG. 5 shows another schematic view of the present invention at work.

FIG. 6 shows an exploded view of the present invention with a bench securing means.

DETAILED DESCRIPTION OF THE EMBODIMENT

As shown in FIGS. 1–3, a clamp seat embodied in the present invention is intended for use in a workbench and is composed of a seat body 10, a bearing plate 20, and an elastic clamp 30.

The seat body 10 is of a U-shaped construction and is provided with two reinforcing plates 11 opposite in location to each other, two fastening holes 12 opposite to each other, and a plurality of locating holes 13 arranged in an arcuate manner in relation to the fastening hole 12 serving as a center. Located between the locating hole 13 and the fastening hole 12 is an arcuate hole 14.

The bearing plate 20 is of a size permitting the bearing plate 20 to fit into the U-shaped seat body 10. The bearing plate 20 is similar in construction to the seat body 10 and is composed of two opposite high walls and two opposite reinforcing plates 21. The two high walls are provided respectively with a through hole 22. A blot hole 23 is located near one of the two through holes 22 and is engaged with a locating bolt 40. One of the two high walls is provided with a control handle 24 of an L-shaped construction and having an axial hole 25. A plate 26 is opposite to the axial hole 25 and is also provided with an axial hole 25. The control handle 24 is provided at one end thereof with a retaining block 27.

The elastic clamp 30 is provided at one end thereof with a locating block 31, and at another end thereof with a retaining ring 32 and a retaining block 33.

As shown in FIGS. 4 and 5, the elastic clamp 30 is located by the axial hole 25 of the control handle 24 in conjunction with a pin 50 engaging the axial hole 25. Located between the elastic clamp 30 and the control handle 24 is an elastic piece 60, which is located by the retaining blocks 27 and 32. The bearing plate 20 and the seat body 10 are located by the a blot 70 which is engaged with the fastening hole 12 and the through hole 22. The bearing plate 20 and the seat body 10 can be turned on the blot 70. When the elastic clamp 30 is pressed, the locating block 31 of the elastic clamp 30 is inserted into the locating hole 13. As long as the elastic clamp 30 remains in the state of being pressed, the locating block 31 is disengaged with the locating hole 13. The locating column 40 is located by the blot hole 23 of the bearing plate 20. As shown in FIG. 6, the clamp may be secured to a workbench by a securing means such as a bolt inserted through hole 80.

What is claimed is:

1. A clamp seat of workbench comprising a seat body, a bearing plate and an elastic clamp; wherein said seat body is U-shaped in construction and provided with two reinforcing plates opposite in location to each other and two high walls each having a fastening hole, one of said high walls provided with a plurality of locating holes; wherein said bearing plate is of a U-shaped construction and provided with two reinforcing plates and two high walls each having a through hole, one of said high walls provided with a control handle having an axial hole and a retaining block; and wherein said elastic clamp is provided with a locating block and a retaining block, said locating block being engageable with said locating holes.

2. The clamp seat of workbench as defined in claim 1, wherein said seat body is provided with an arcuate hole located between said locating hole and said fastening hole; wherein said bearing plate is provided with a blot hole engaged with a locating bolt; and wherein said elastic clamp is provided with a retaining ring engageable with said control handle.

3. The clamp seat of workbench as defined in claim 1, wherein said seat body is provided with a hole in a bottom thereof, said hole being adapted to receive a securing means to secure said seat body to a working surface.

4. The clamp seat of workbench as defined in claim 1, wherein said bearing plate is provided with a round hole for mounting a clamping tool on said bearing plate.

* * * * *